United States Patent Office 3,667,993
Patented June 6, 1972

3,667,993
METHOD FOR COATING A SUBSTRATE WITH A HEAT CURABLE SILICONE RUBBER AND RESULTING PRODUCT
Joseph Eugene Stevenson, Adrian, Mich., assignor to Stauffer-Wacker Silicone Corporation
No Drawing. Filed Mar. 27, 1968, Ser. No. 716,341
Int. Cl. B32b 25/20; B44d 1/14
U.S. Cl. 117—72                               3 Claims

ABSTRACT OF THE DISCLOSURE

Substrates are coated with heat curable silicone rubbers using alkenyl acyloxysilanes as primers.

---

The present invention relates to primers and more particularly to primers for bonding silicone rubbers to substrates.

Heretofore, silicone rubbers have been bonded, under heat and pressure, to substrates by first coating the substrate wth alkyl acyloxy- or alkyl alkoxysilanes prior to the application of the silicone rubbers. Among the silanes which have been used as primers are tetraethyl orthosilicates, t - butoxytriethoxysilane, methyltriethoxysilane, methyltriacetoxysilane, ethyltriacetoxysilane, propyltriacetoxysilane, and the like.

However, these heretofore known primers have a tendency to migrate on the substrate surface when pressure is applied in the application of heat curable rubbers. In addition, these primers do not provide good day-to-day reproducibility, especially when applied to substrates and stored for long periods of time.

It is therefore an object of this invention to provide primers for heat curable silicone rubbers. Another object of this invention is to provide primers which will not migrate on the substrate when used under pressure in the application of heat curable silicone rubbers. Still another object of this invention is to provide primers which are reproducible on a day-to-day basis. A further object of this invention is to provide primers which are stable even when stored for long periods of time. A still further object of this invention is to provide a substrate having heat curable silicone rubbers bonded thereto.

The foregoing objects and others which will become apparent from the following discussion are accomplished in accordance with this invention, generally speaking, by providing a composition which may be applied to a substrate for bonding heat curable silicone rubbers thereto. The composition of this invention comprises a silane of the formula $$R_nSi(OOCR')_{4-n}$$

wherein R is an alkenyl radical having from 2 to 10 carbon atoms; R' is an alkyl group having from 1 to 5 carbon atoms; and n is an integer of from 1 to 2.

Referring to the above formula, R is an unsaturated hydrocarbon chain which may be open or closed, that is to say, it may be an unsaturated straight-chain aliphatic hydrocarbon or an unsaturated cycloaliphatic hydrocarbon. The hydrocarbon will contain at least one double bond and will contain from about 2 to 10 carbon atoms and more preferably from about 2 to 6 carbon atoms. Examples of such unsaturated hydrocarbon chains are vinyl, 1-propenyl, 2-propenyl, isopropenyl, 1-butenyl, 2-butenyl, 3-butenyl, 1-isobutenyl, 2-isobutenyl, 1-sec-butenyl, 2-sec-butenyl, 1-methyl-2-propenyl, 1-pentenyl, 2-pentenyl, 4-pentenyl, 1-hexenyl, 3-hexenyl, 5-hexenyl; corresponding branched chain isomers such as 3,3-dimethyl-1-butenyl, 2,3-dimethyl-1-butenyl, 2,3-dimethyl-2-butenyl, 2,3 - dimethyl-3-butenyl, 1-methyl-1-ethyl-2-propenyl, and the various isomers of heptenyl, octenyl, nonenyl, decenyl, cyclo-hexenyl, bicyclo-heptenyl, cyclo-pentadienyl, butadiene, and the like. Preferably, R is a vinyl group. In the foregoing formula, R' is an alkyl group, preferably a lower alkyl group, containing from 1 to 5 carbon atoms, such as methyl, ethyl, propyl, butyl, pentyl, and the like. Exemplary of a suitable compound is vinyltriacetoxysilane.

In applying the present composition as a primer on a substrate, the composition may be applied to the surface by any conventional technique, such as by spraying, dipping, brushing, wiping, and the like and then dried. Generally, the treated surface of the substrate and the silicone rubber are brought together so that the primer composition is interposed between the silicone rubber and the substrate and then heated under pressure.

Generally, the primer composition is applied as a solvent solution, preferably containing from about 1 to 20 percent by weight and more preferably from about 2 to 5 percent by weight of the silane. Examples of suitable solvents which may be used are the aromatic hydrocarbons, such as benzene, toluene, xylene, naphthalene, and the like; halogenated aromatic hydrocarbons, such as chlorobenzene; aliphatic hydrocarbons, such as pentane, hexane, octane, decane; and halogenated aliphatic hydrocarbons, such as methylene chloride, carbon tetrachloride, perchloroethylene, and the like.

The drying rate of the primer composition is primarily dependent on two factors. One factor is the rate of condensation of the silane or partial hydrolyzates thereof which is dependent first, on the size of the R and R' radicals and second, on the amount of water present for hydrolysis of the R' radicals to volatile acids. Where R and R' are larger than the claimed limits, the rate of hydrolysis and condensation of the silanes is reduced to the point where the primer composition does not dry satisfactorily. Where the silane is exposed to water as, for example, in the form of steam, hydrolysis and condensation may be accelerated.

The other factor which may influence the drying rate is the presence or absence of solvent. If a solvent is employed, the volatility of the solvent effects the drying rate of the primer coating. Thus, the solvent should be sufficiently volatile to evaporate at least as rapidly as the silane can hydrolyze and condense under the coating conditions. Due to the possible variations of the two factors above, it is impossible to set limits on the drying time for the coating which may vary from a few seconds to several hours.

Heat curable silicone rubbers are elastomeric organosilicone polymers, that is to say, organopolysiloxanes which upon heating in combination with an appropriate curing catalyst are converted to the solid elastomeric state. Since the heat and pressure employed during the bonding operation of the present invention may be relied upon to convert the organopolysiloxane to the solid elastomeric state, the organopolysiloxane actually employed in making this assembly may be and preferably is in the uncured state, that is to say, in a convertible state.

The heat curable silicone rubbers are well known to those familiar with the art. They may be described as polysiloxanes containing hydrocarbon radicals, silicon, and oxygen atoms having the recurring structural units:

wherein R'', which may be the same or different, are monovalent hydrocarbon radicals, such as alkyl, aryl, aralkyl, alkaryl, cyclic, and alkenyl radicals. Examples of suitable alkyl radicals are methyl, ethyl, propyl, butyl, hexyl, etc.; aryl radicals are phenyl, naphthyl, etc.; aralkyl radicals are benzyl, phenethyl, etc.; alkaryl radicals are tolyl, xylyl, etc.; cyclic radicals are cyclopentyl, cyclohexyl, etc.; and alkenyl radicals, such as vinyl radicals. Preferably, the R"(s) are the same and are lower alkyl radicals.

In the preferred embodiment, the polysiloxanes have an average ratio of hydrocarbon groups to silicon atoms of from about 1.9 to about 2.0 hydrocarbon groups per silicon atom. Preferably, the polysiloxane contains an average of from 1.98 to 2.0 hydrocarbon, e.g., methyl groups, per silicon atom. Examples of suitable heat curable silicone rubbers are methyl vinyl silicone rubber, methyl phenyl vinyl silicone rubber, and the like. The specific silicone rubber employed in accordance with the present invention is not critical and may be selected from any of the well known varieties.

As is conventional, the silicone rubbers are mixed with a curing catalyst, such as benzoyl peroxide, di-t-butyl peroxide, 2,4-dichlorobenzoyl peroxide, 2,5-bis(t-butylperoxy)2,5-dimethylhexane and a filler, if desired, and then applied to the treated substrate.

Any of the conventional fillers may be incorporated in the silicone rubber. Among the fillers which may be employed are fumed and precipitated silicas, such as CAB-O-SIL, QUSO, HI-SIL, SANTOCEL, diatomaceous earths, clays, lithopone, ferric oxide, titanium dioxide, talc, zinc oxide, and various forms of carbon. The fillers may be incorporated in amounts ranging from about 10 to 90 percent, preferably from about 25 to 75 percent of the total weight of the composition.

Before applying the primer composition to metal substrates, the metal surface is cleaned and free of loose oxide scale. This may be accomplished by a wide variety of ways well known to those skilled in the art. For example, the surface may be first degreased as by dipping the substrate in a degreasing solution or by subjecting the article to vaporized degreasing materials, such as trichloroethylene. Following the degreasing operation, the metal surface may be further cleaned by scouring, heating or by blasting the surface with conventional material, such as steel, shot, grit, sand, and the like. In the case of fabrics, the primer may be applied directly to greige goods, although it may be beneficial to treat a sized fabric with heat and/or a solvent prior to the application of the primer.

In bonding silicone rubbers to the treated substrates, the temperature employed during the bonding operation may vary somewhat depending upon the nature of the silicone rubbers, the catalysts, and the substrates. Generally, temperatures ranging from about 100° to about 300° C. may be employed. However, sufficient time should be allowed to cure the rubber and to provide for the bonding of the rubber to the substrate which may range from about 1 minute to about 48 hours including any postcure. The pressure employed may also vary and may be as low as that necessary to provide for intimate contact, that is, a few pounds per square inch. The upper limit of pressure is not critical and pressures as high as a few thousand pounds per square inch may be employed depending upon the initial bonding cycle. The bond provided by this hot pressing operation may be further improved by additional curing at higher temperatures for longer periods of time. For example, following the pressing operation, the assembly may be heated to from about 150° to about 300° C. for several hours by placing it in an oven through which hot air is circulated.

Substrates may be coated with the silane of this composition and cured at room temperature or the cure may be accelerated at elevated temperatures in the presence of moisture. If desired, the coated substrates may be stored for up to 3 months and then coated with silicone rubbers in the conventional manner.

In using the primer composition of this invention, it was found that silicone rubbers may be bonded to a wide variety of substrates, including metal, ceramic, glass, glass fabric, wood, resin, resin bonded bodies, rubber, including other silicone rubber, fabrics containing synthetic fibers, and the like. Generally, the silicone rubbers are bonded to metal substrates, such as steel, aluminum, aluminium alloys, copper, copper alloys, including brass, magnesium, magnesium alloys, stainless-steel, and the like. Fabrics, such as those made from synthetic fibers, like Dacron, nylon, and the like, may be employed as substrates for bonding silicone rubbers thereto.

The primer composition of this invention provides a protective coating for metals which is not affected by boiling water even in the presence of detergents, resists abrasion, and is highly resistant to heat. In addition, the composition provides an unusually good bond between silicone rubbers and other substrates; the bond strengths being generally of greater magnitude than those provided by other silane type compositions. The bonds formed during press cure are generally stronger than the silicone rubber itself as shown when attempts are made to separate the rubber from the substrate. In addition, the primer coating does not migrate on the substrate when silicone rubbers are applied under pressure, thus providing for greater adhesion between the silicone rubbers and the substrates.

Various aspects of the invention are further illustrated by the following examples in which all parts are by weight unless otherwise specified.

EXAMPLE 1

(a) A solution is prepared by adding 20 parts of vinyltriacetoxysilane to 80 parts of toluene with agitation. A previously degreased aluminum substrate is coated with the solution and dried for about 45 minutes at a relative humidity of about 50 percent at about 25° C.

Methyl vinyl silicone rubber stock catalyzed with 2,4-dichlorobenzoyl peroxide is applied to the coated substrate, cured under pressure for about 10 minutes at about 116° C. and then oven cured at about 249° C. for 24 hours. After both pressure and post-curing, the bond between the aluminum substrate and silicone rubber is measured in accordance with the 90° stripping test, ASTM D429–58 Method "B." The silicone rubber failed at 24 pounds per inch while the adhesive bond between the silicone rubber and the aluminum substrate remained intact.

(b) A solution is prepared by adding 10 parts of vinyltriacetoxysilane to toluene in about 90 parts of toluene and applied to a previously cleaned aluminum substrate in accordance with the procedure described in Example 1(a). The adhesive bond between the aluminum and silicone rubber remained intact, while a cohesive failure resulted in the rubber at 24 pounds per inch.

(c) A solution is prepared by adding 1 part of vinyltriacetoxysilane to about 99 parts of toluene and applied to a previously cleaned aluminum substrate in accordance with the procedure described in Example 1(a). The adhesive bond between the aluminum substrate and silicone rubber remained intact, while a cohesive failure resulted in the silicone rubber at 25 pounds per inch.

(d) A solution is prepared by adding 2 parts of methyltriacetoxysilane to 98 parts of toluene in accordance with the procedure described in Example 1(a). An adhesive failure resulted in the bond between the aluminum substrate and the silicone rubber, while the silicone rubber remained intact.

(e) A solution is prepared by adding 5 parts of methyltriacetoxysilane to about 95 parts of toluene and applied to a previously cleaned aluminum substrate in accordance with the procedure described in Example 1(a). The adhesive bond between the coated aluminum substrate and the silicone rubber failed, while the cohesive bond of the silicone rubber remained intact.

EXAMPLE 2

A solution containing about 2 parts of vinyltriacetoxysilane in about 98 parts of toluene is applied to several previously degreased and dried metal substrates and dried for about 1 hour at 35° C. in a 50 percent relative humidity. A methyl vinyl silicone rubber stock catalyzed with either 2,4-dichlorobenzoyl peroxide or 2,5-bis(t-butylperoxy)-2,5-dimethylhexane is applied to each of the primed substrates, press cured for 10 minutes at 116° C., and then oven cured for 24 hours at 249° C. The bond between the silicone rubber and the metal substrate is measured by the 90° stripping test, ASTM D429-58, Method "B." The results, which are illustrated in Table I, show in a majority of the tests a cohesive failure in the silicone rubber.

TABLE I
Bond strength (p.p.i.)

| Metal | Catalyst[1] | | Catalyst[2] | |
|---|---|---|---|---|
| | Press cured 10 min./ 116° C. | Oven cured 24 hr./ 249° C. | Press cured 15 min./ 171° C. | Oven cured 24 hr./ 249° C. |
| Steel, SAE 1020 | 28(c) | 28(c) | 36(c) | 32(c) |
| Stainless-steel, Type 304 | 32(c) | 29(c) | 40(c) | 28(c) |
| Copper | 32(c) | 3(a) | 40(c) | 32(c) |
| Brass | 32(c) | 0(a) | 40(c) | 32(c) |
| Aluminum, Type 7075 | 24(c) | 27(c) | 41(c) | 23(a) |
| Titanium, No. 811 | 29(c) | 34(c) | 40(c) | 18(a) |

[1] 2,4-dichlorobenzoyl peroxide.
[2] 2,5-bis(t-butylperoxy)-2,5-dimethyl hexane.
NOTE: (a) Adhesive failure. (c) Cohesive failure.

A methyl phenyl vinyl silicone rubber stock catalyzed with 2,4 - dichlorobenzoyl peroxide or 2,5 - bis(t-butylperoxy)-2,5-dimethylhexane is applied to primed substrates prepared in accordance with the procedure described in Example 2, press cured for 10 minutes at 116° C., and oven cured for 24 hours at 249° C. The results of these tests are illustrated in Table II.

TABLE II
Bond strength (p.p.i.)

| Metal | Catalyst[1] | | Catalyst[2] | |
|---|---|---|---|---|
| | Press cured 10 min./ 116° C. | Oven cured 24 hr./ 249° C. | Press cured 15 min./ 171° C. | Oven cured 24 hr./ 249° C. |
| Steel, SAE 1020 | 28(c) | 12(a) | 28(a) | 16(a) |
| Stainless-steel, Type 304 | 39(c) | 6(a) | 49(c) | 5(a) |
| Copper | 15(a) | 3(a) | 34(c) | 20(c) |
| Brass | 12(a) | 2(a) | 42(c) | 19(a) |
| Aluminum, Type 7075 | 34(a) | 2(a) | 50(c) | 12(a) |
| Titanium, No. 811 | 15(a) | 5(a) | 52(c) | 9(a) |

[1] 2,4-dichlorobenzoyl peroxide.
[2] 2,5-bis(t-butylperoxy)-2,5-dimethylhexane.
NOTE: (a) Adhesive failure. (c) Cohesive failure.

EXAMPLE 4

A solution containing about 2 parts of vinyltriacetoxysilane in about 98 parts of toluene is applied to greige goods and dried at ambient temperature at a relative humidity of from 30 to 70 percent.

A methyl vinyl silicone rubber stock catalyzed with 2,4-dichlorobenzoyl peroxide is applied to the fabric, press cured for 10 minutes at 116° C., and then oven cured for 4 hours at 149° C.

Where 2,5 - bis(t - butylperoxy)-2,5-dimethylhexane is used as a catalyst with the methyl vinyl silicone rubber, the composition is press cured for 15 minutes at 171° C. and then oven cured for 4 hours at 149° C.

Where methyl vinyl silicone rubber is catalyzed with 2,4-dichlorobenzoyl peroxide and applied to a glass fiber substrate, the composition is oven cured for 4 hours at 249° C. and then cured for 24 hours at 249° C.

In treating glass fiber with methyl vinyl silicone rubber catalyzed with 2,5-bis(t-butylperoxy)-2,5-dimethylhexane, the glass fiber is pressed cured for 15 minutes at 117° C., oven cured for 4 hours at 249° C., and then oven cured for an additional 24 hours at 249° C.

The bond between the silicone rubber and the fabric is measured by the conventional stripping test, ASTM D429-58, Method "B" Modified 180°. The results of these tests are shown in Table III.

TABLE III
Bond strength (p.p.i.)

| Fabric | Catalyst[1] | | Catalyst[2] | |
|---|---|---|---|---|
| | Press cured 10 min./ 116° C. | Oven cured 4 hr./ 149° C. | Press cured 15 min./ 171° C. | Oven cured 4 hr./ 149° C. |
| Nylon | 37(c) | 24(c) | 30(c) | 36(c) |
| Nomex[3] | 35(c) | 15(c) | 30(c) | 22(a) |
| Dacron | 11(a) | 11(a) | 17(c) | 13(a) |
| | 4 hr./ 249° C. | 24 hr./ 249° C. | 4 hr./ 249° C. | 24 hr./ 249° C. |
| Glass fiber | 25(c) | 25(c) | 25(c) | 35(c) | 45(c) | 34(c) |

[1] 2,4-dichlorobenzoyl peroxide.
[2] 2,5-bis(t-butylperoxy)-2,5-dimethylhexane.
[3] Du Pont trademark.
NOTE: (a) Adhesive failure. (c) Cohesive failure.

EXAMPLE 5

A methyl phenyl vinyl silicone rubber stock catalyzed with 2,4-dichlorobenzoyl peroxide is applied to a fabric treated in accordance with the procedure described in Example 4. The silicone rubber coated substrate is press cured for 10 minutes at 116° C. and then oven cured for 4 hours at 149° C.

A methyl phenyl vinyl silicone rubber stock catalyzed with 2,5-bis(t-butylperoxy)-2,5-dimethylhexane is applied to a fabric treated in accordance with the procedure described in Example 4. The silicone rubber coated fabric is press cured for 15 minutes at 171° C. and then oven cured for 4 hours at 149° C. The bond between the silicone rubber and the fabric is measured by the conventional stripping test, ASTM D429-58, Method "B" Modified 180°. The results of these tests are shown in Table IV.

TABLE IV
Bond strength (p.p.i.)

| Fabric | Catalyst[1] | | Catalyst[2] | |
|---|---|---|---|---|
| | Press cured 10 min./ 116° C. | Oven cured 4 hr./ 149° C. | Press cured 15 min./ 171° C. | Oven cured 4 hr./ 149° C. |
| Nylon | 15(a) | 18(a) | 32(a) | 32(a) |
| Nomex[3] | 12(a) | 16(a) | 15(a) | 22(a) |
| Dacron | 18(a) | 13(a) | 30(a) | 34(a) |
| Glass fiber | 16(a) | 10(a) | 27(c) | 25(c) |

[1] 2,4-dichlorobenzoyl peroxide.
[2] 2,5-bis (t-butylperoxy)-2,5-dimethylhexane.
[3] Du Pont trademark.
NOTE: (a) Adhesive failure. (c) Cohesive failure.

When the above examples are repeated using other silanes, such as isopropenyl triacetoxysilane, 1-hexenyltriacetoxysilane, 1-octenyltriacetoxysilane, vinyltripropionyloxysilane, and isopropenyltrivaleryloxysilane in combination with other silicone rubbers, the bonds between the substrates and the silicone rubbers are substantially equivalent to those of the specified examples.

Although specific examples of the invention have been described herein, other variations and modifications will be apparent to those skilled in the art without departing from the inventive concept.

The invention claimed is:
1. A method for coating a substrate with a heat curable silicone rubber which comprises coating the substrate with an inert organic solvent solution of a composition consisting essentially of a silane of the formula

$$R_nSi(OOCR')_{4-n}$$

in which R is an alkenyl radical having from 2 to 10 carbon atoms, R' is an alkyl radical having from 1 to 5 carbon atoms and n is an integer of from 1 to 2, drying the coated substrate at ambient temperature, applying a heat curable silicone rubber containing a peroxide catalyst for the silicone rubber to said coated substrate and thereafter heating to an elevated temperature to cure the silicone rubber.

2. The method of claim 1 wherein the silane is present in an amount of from 1 to 20 percent by weight based on the weight of the solution.

3. An article of manufacture comprising a substrate, a heat cured silicone rubber bonded to said substrate and a dried film of a hydrolyzed and condensed silane interposed between said substrate and the silicone rubber, said silane obtained from the hydrolysis and condensation of a compound of the formula $$R_nSi(OOCR')_{4-n}$$

in which R is an alkenyl radical having from 2 to 10 carbon atoms, R' is an alkyl radical having from 1 to 5 carbon atoms and $n$ is an integer of from 1 to 2.

References Cited
UNITED STATES PATENTS

| | | | |
|---|---|---|---|
| 2,902,389 | 9/1959 | Keil | 117—72 |
| 2,979,420 | 4/1961 | Harper | 117—72 |
| 3,088,847 | 5/1963 | Pines | 117—75 |
| 3,108,898 | 10/1963 | Nitzsche et al. | 117—75 |
| 3,318,717 | 5/1967 | Simpson | 117—72 X |

FOREIGN PATENTS

| | | | |
|---|---|---|---|
| 644,942 | 7/1962 | Canada | 117—72 |

WILLIAM D. MARTIN, Primary Examiner

R. HUSACK, Assistant Examiner

U.S. Cl. X.R.

117—49, 75, 76 T, 124 F, 126 GS, 132 BS; 156—329; 161—206, 207; 260—448.2